US006272727B1

(12) United States Patent
Fish

(10) Patent No.: US 6,272,727 B1
(45) Date of Patent: *Aug. 14, 2001

(54) FILE BIASING METHODS AND APPARATUS

(76) Inventor: Robert D. Fish, 3000 S. Augusta Ct., La Habra, CA (US) 92835

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,561

(22) Filed: Oct. 6, 1997

(51) Int. Cl.[7] .................... B23P 15/00
(52) U.S. Cl. .................... 29/428; 312/183
(58) Field of Search .................... 312/183; 29/450, 29/428

(56) References Cited

U.S. PATENT DOCUMENTS 4,012,087 * 3/1977 Edwards, Jr. .................... 312/183

FOREIGN PATENT DOCUMENTS

464237 * 4/1950 (CA) .................... 312/183
863411 * 4/1941 (FR) .................... 312/183
604318 * 7/1948 (GB) .................... 312/183

* cited by examiner

*Primary Examiner*—S. Thomas Hughes
*Assistant Examiner*—Marc W. Butler
(74) *Attorney, Agent, or Firm*—Fish & Associates, LLP; Robert D. Fish

(57) ABSTRACT

The upper portion of files in a file drawer or other file holder are biased towards the rear of the file holder using a wedge, block, bar or other device. In preferred embodiments the biasing device remains unattached to the file holder. The rearward biasing can also be combined with a member for biasing the lower portion of files towards the front of the file holder.

5 Claims, 2 Drawing Sheets

FIG. 1
PRIOR ART
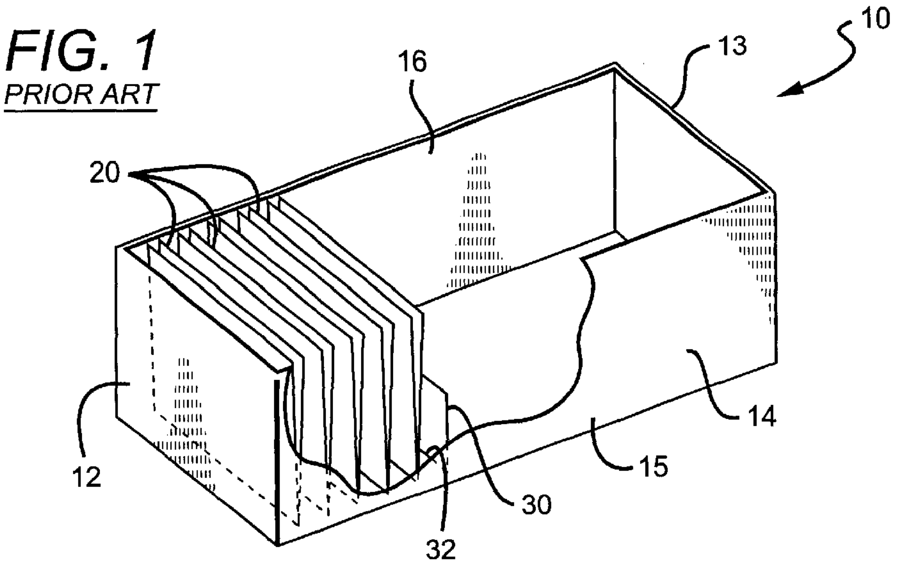
FIG. 2A
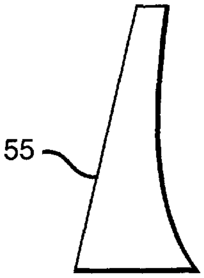
FIG. 2B
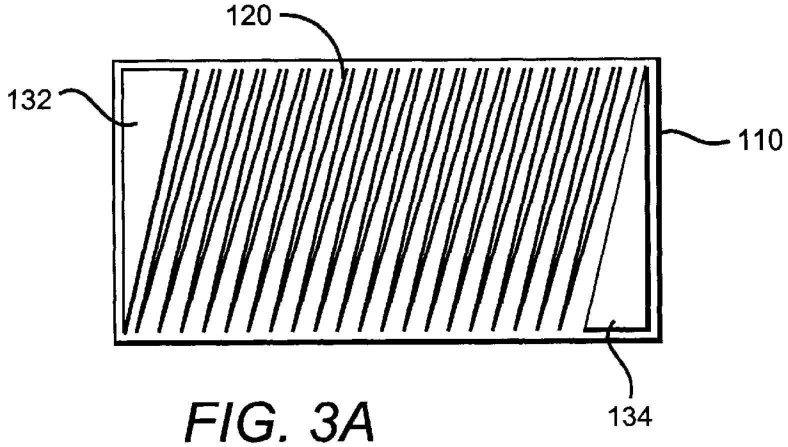
FIG. 3A

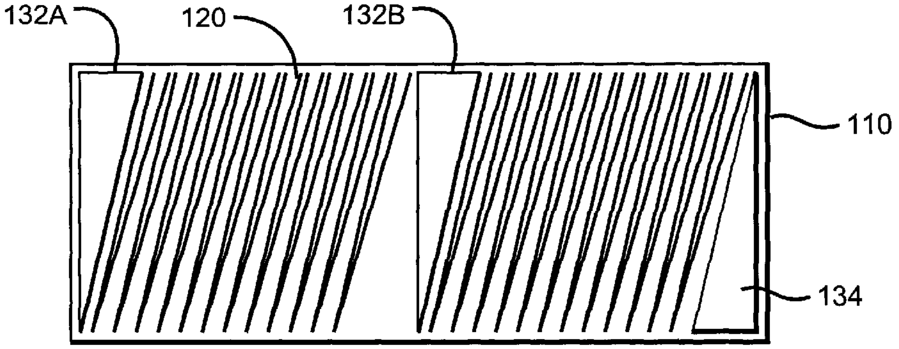
FIG. 3B
FIG. 4A
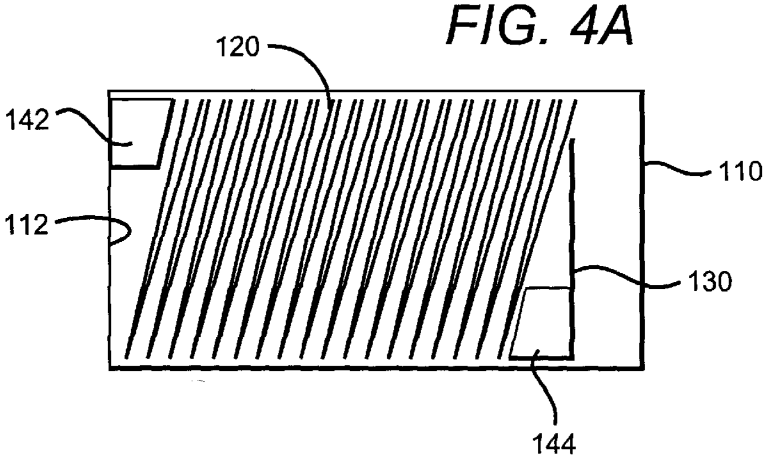
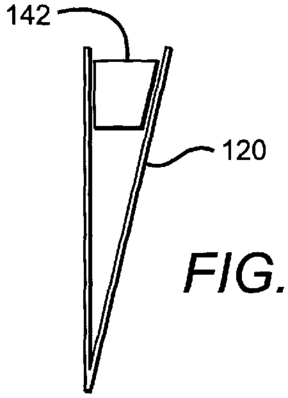
FIG. 4B
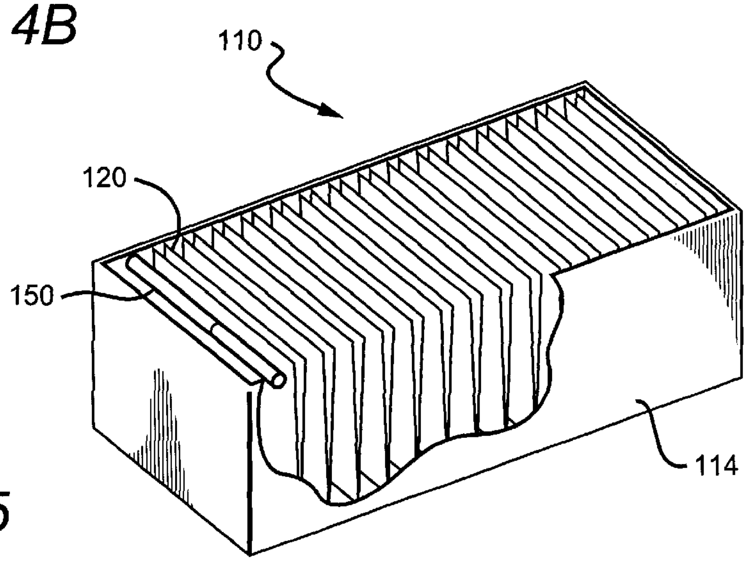
FIG. 5

FILE BIASING METHODS AND APPARATUS

FIELD OF THE INVENTION

The field of the invention is office equipment and supplies.

BACKGROUND

Folders are ubiquitous in modern offices. In most cases folders comprise little more than a folded piece of paper or plastic, with the "fold" ranging anywhere from the hard, creased fold of a standard "manilla" folder, to a soft "fold" or bend of a hanging folder. Folders generally also have a tab or other extended portion at one of the sides for including identification information. In most instances office folders are used to contain papers, and where the papers comprise a file of information, the folder is properly called a file folder. But it is widely accepted that items sold as file folders may also contain computer disks, writing implements, and a host of other items, and the terms file folders and folders are used synonymously herein in a broad generic sense.

Folders are generally intended to be kept upright in a file drawer, file box or other file holder so that the file identification information is viewable on all of the files at the same time, and so that each of the files are more or less accessible without significantly disturbing the other files. It is not always feasible, however, to maintain folders in an upright position, and this is largely due to the fact that smaller and heavier items tend to locate at the bottom (folded portion) of a folder, where they increase the thickness of the folder. Where this occurs in multiple files within the same file drawer or other holder, all of the folders tend to fall forward or backward in the file holder. While this problem is often only a minor nuisance, it does create difficulty in viewing the folder identification information, and in accessing individual folders and their contents.

The problem has been addressed in part by providing a moveable partition. Such partitions can effectively reduce the volume of space available to the files, thus tending to keep them upright. Alternatively, a partition can be made to pivot against the floor of the file holder. This biases the bottom portions of the files forward and allows the top portions of the files to fall backward. While such partitions are of some use, the relatively free pivoting tends to tilt the files much farther than is necessary. Previously known such partitions are also limited to file drawers, such as those found in metal cabinets, which are strong enough and otherwise adapted to securing such partitions.

Thus, there remains a considerable need for devices and methods which can conveniently position file folders in substantially any file holder.

SUMMARY OF THE INVENTION

It has recently been discovered that the above-mentioned problems can be resolved by biasing the upper portion of files in a file drawer or other file holder towards the rear of the file holder. In preferred embodiments this can be accomplished using a floating member such as a simple wedge, and in other embodiments by using attached members such as restraining bars, spring loaded partitions and so forth. The rearward biasing can also be combined with a member for biasing the lower portion of files towards the front of the file holder.

Various objects, features, aspects and advantages of the present invention will become more apparent from the following detailed description, in conjunction with the accompanying drawings, wherein like numerals represent like components.

BRIEF DESCRIPTION OF THE DRAWING

FIG. 1 is a perspective schematic view of a prior art file drawer containing files.

FIGS. 2A and 2B are a perspective views of file wedges according to the present inventive subject matter.

FIG. 3 is a side schematic view of front and rear file wedges installed into a file holder.

FIG. 4A is a side schematic view of front and rear file blocks installed into a file holder.

FIG. 4B is a side view schematic of a file folder carrying a wedge.

FIG. 5 is a top schematic view of a front file bar installed into a file holder.

DETAILED DESCRIPTION

In FIG. 1 a file drawer 10 generally comprises a front 12, a rear 13, two sides 14 a bottom 15 and an open top 16. Contained within the file drawer 10 are numerous files 20, and a moveable partition 30 which reduces the effective size of the drawer to correspond with the thickness of files 20. In the particular drawer shown, partition 30 is attached (albeit removably) at pivot 32, which pushes the bottoms of the files forward and allows the tops of the files to tilt backwards.

In FIG. 2A wedge 50 is sized and dimensioned to both fit in a file holder and bias the files to improve convenience of access. Since a typical file cabinet has a file space about 28 cm high, it is advantageous for a file wedge to measure less than about 28 cm from its thickest end to its thinnest end. Similarly, since file folders tend to less than about 23–25 cm from the bottom of the fold to the top of the tab, it is even more advantageous for a file wedge to measure less than about 25 cm from its thickest end to its thinnest end. It is also advantageous for preferred wedges to have about the same length and height dimensions as a piece of legal letter, A4 or other paper. Thus, particularly preferred wedges for use in conjunction with letter sized file folders may measure between about 25 and 30 cm in one dimension by between about 17 and 25 cm in another dimension. The thickness of preferred wedges can also vary greatly, but is preferably no more than about 7 cm at the widest point and no less than about 0.25 cm at the narrowest point. Of course, other sizes and shapes are contemplated as well, including wedges which are not even triangular. In FIG. 2B, for example, wedge 55 is not triangular in many respects.

It is contemplated that file wedges can be manufactured from many different compositions. In preferred embodiments a lightweight foam can be used, and this is advantageous from many perspectives including minimal cost in manufacture and transportation. Foam wedges are also advantageous in that they can be manufactured to yield, i.e., become compressed, while one is working with files in a file drawer. In less preferred embodiments wedges can be manufactured from wood, ceramic, metal composites and the like. Wedges can also be colored or otherwise marked for aesthetics, or to aid in separation of files.

In FIG. 3A a file drawer 110 generally contains a plurality of files 120, a front file wedge 132 and a rear file wedge 134. Here, the wide portion of the front file wedge 132 is in the "up" position while the wide portion of the rear file wedge is in the "down" position. The overall effect is to tilt the tops of the files backwards for easy viewing.

It is important to note that the terms "front" and "back" are relative. Thus, a "front" file wedge need not be located at the very front of the file holder, but may instead be preceded by one or more files. Similarly, a "back" file wedge need not be located at the very rear of the file holder, but may instead be followed by one or more files. An important characteristic of a "front" file wedge is that it is wider at the top than at the bottom while a "back" file wedge is wider at the bottom than at the top. It is also contemplated that a single file holder may employ more than two file wedges at the same time. In FIG. 3A., for example, file holder 110 has two "front" file wedges 132A and 132B, and only one "back" wedge 134.

FIG. 4A depicts an alternative embodiment in which a front block 142 and a rear block 144 have been installed at the front and back, respectively, of a series of files 120. Here again the purpose is to maintain the files 120 in a backward leaning attitude to improve accessibility, and the precise size, shape and composition of the blocks is not critical. Thus, while foam blocks are presently preferred, it is also feasible that the blocks 142, 144 could be manufactured from some other material(s). Similarly blocks 142, 144 could have a square or rectangular cross-section rather than the wedge cross-sections shown. It is contemplated that biasing members, such as the blocks 142 and 144, can be maintained in place by glue or any other available means. For example, in FIG. 4 front block 142 may advantageously be glued to the front wall 112 of file holder 110, and rear block 144 may advantageously be glued to moveable partition 130. However, in an alternative embodiment, front block 142 may simply be glued to the upper portion of a file folder 120 as shown in FIG. 4B. Moreover rear block 144 may not be attached to anything at all, and may instead float freely on the bottom of the file holder.

Other embodiments are also possible. In FIG. 5, for example, a spring-loaded bar 150 similar to a curtain rod is compressed across the sides Thus, while specific embodiments and applications of file biasing methods and apparatus have been shown and described, it would be apparent to those skilled in the art that many more modifications are possible without departing from the inventive concepts herein. The invention, therefore, is not to be restricted except in the spirit of the appended claims.

I claim:

1. A method of biasing files in a file holder, comprising:

identifying a front, a rear and a bottom of the file holder;

inserting a folder into the file holder, the folder having an upper portion and a lower portion;

positioning a first wedge shaped biasing member between the front of the file holder and the file such that the upper portion of the folder is biased towards the rear of the file holder to a greater extent than the lower portion of the folder; and positioning a second wedge shaped biasing member between the rear of the file holder and the file such that the lower portion of the folder is biased towards the front of the file holder to a greater extent than the upper portion of the folder;

wherein each of the first and second biasing members has no attachment to the file holder when the first and second biasing members bias the folder.

2. The method of claim 1 wherein the file holder comprises a drawer in a file cabinet.

3. The method of claim 1 wherein the first wedge shaped biasing member measures between about 25 and 30 cm in one dimension by between about 17 and 25 cm in another dimension.

4. The method of claim 1 wherein the first wedge shaped biasing member has a thickest end and a thinnest end, and a distance measured between the thickest end and the thinnest end is less than 28 cm.

5. The method of claim 1 wherein the first wedge shaped biasing member has a thickest end and a thinnest end, and a distance measured between the thickest end and the thinnest end is less than 25 cm.

* * * * *